Figure 1:
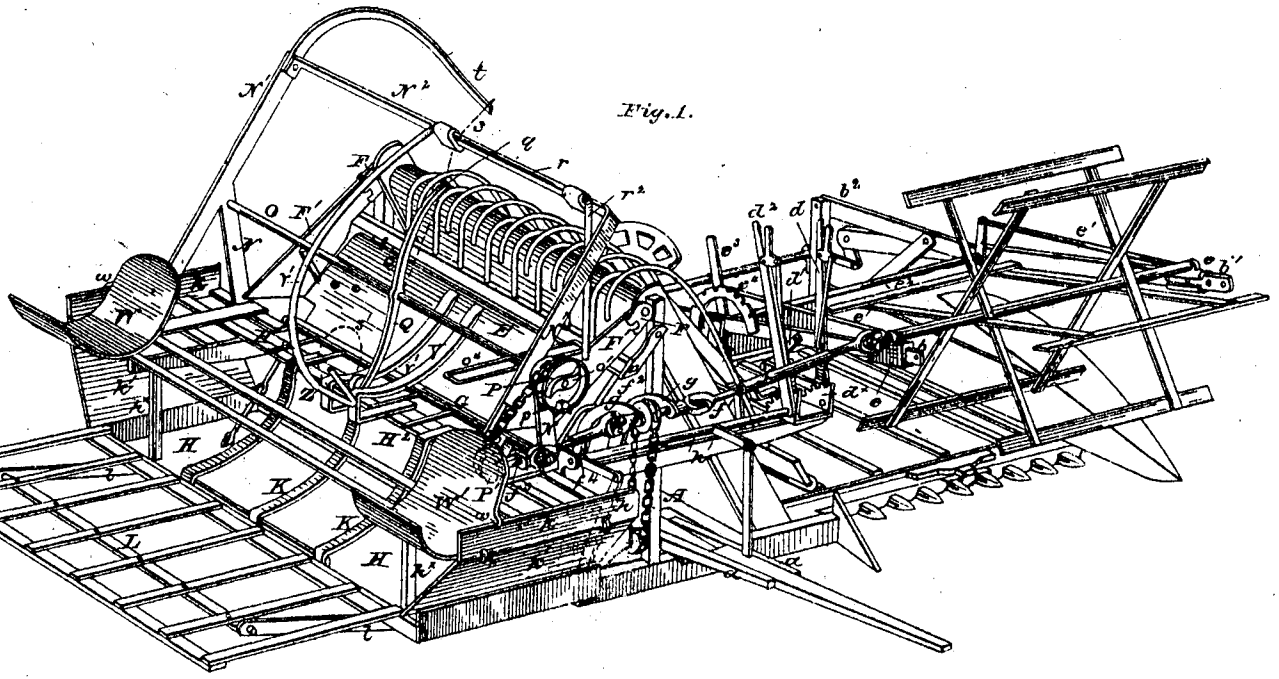

J. H. ELWARD, 2 Sheets—Sheet 1.

Assignor to THE ST. PAUL HARVESTER WORKS.

Harvester.

No. 9,179. Reissued April 27, 1880.

Attest:
N. G. Barnes
J. S. Barker

Inventor:
John H Elward
by A H Doubleday atty

J. H. ELWARD,
Assignor to THE ST. PAUL HARVESTER WORKS.
2 Sheets—Sheet 2.
Harvester.
No. 9,179
Reissued April 27, 1880.
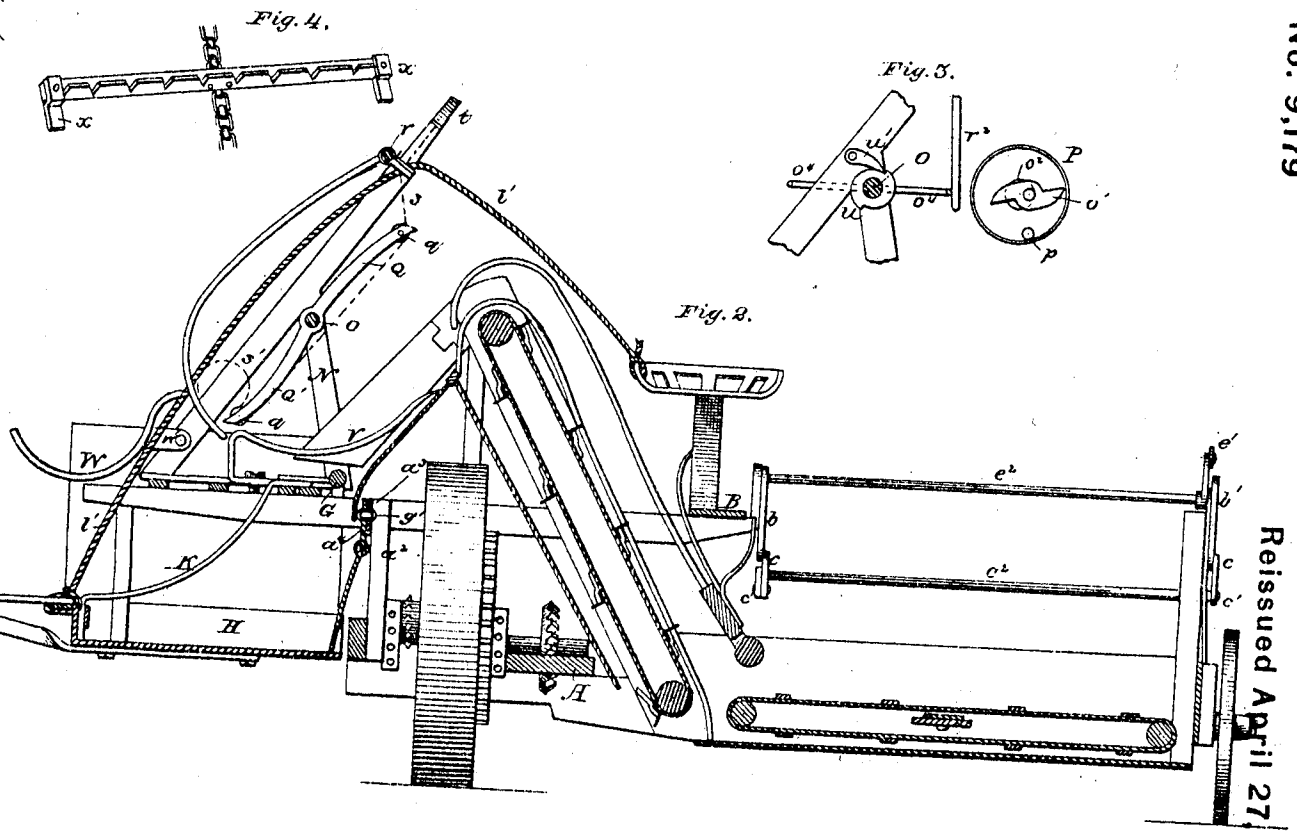
Witnesses:
R. G. Barnes.
J. S. Barker.
Inventor:
John H Elward
by H. W. Doubleday
atty 9,179. HARVESTER. John H. Elward, Stillwater, assignor to the St. Paul Harvester Works, St. Paul, Minn. Original No. 177,231, dated May 9, 1876. Filed June 12, 1879.

*To all whom it may concern:*

Be it known that I, JOHN H. ELWARD, of Stillwater, in the county of Washington and State of Minnesota, have invented certain new and useful Improvements in Harvesters; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

Figure 1 is a perspective view of a harvesting-machine embracing my improvements. Fig. 2 is a transverse vertical section through the same, and Figs. 3 and 4 are detached views of parts of the machine hereinafter described.

Similar letters of reference denote corresponding parts wherever used.

My invention relates, first, to a novel arrangement of means for effecting the desired adjustments of the reel; second, to a novel arrangement of delivery-chute in connection with the grain-receiver and dumping-tray; third, to means for determining the position of the gavel relative to the bundling devices; fourth, to the bundling devices themselves; and, lastly, to certain details hereinafter fully described.

The machine in its general organization is similar to many now in use, and it need therefore be described only so far as is necessary to an understanding of my improvements.

In the accompanying drawings, A represents the gear-plank or main longitudinal bar of the main frame, upon which the driving-gearing of the machine is mounted in a manner described in a former application. This gear-plank is located upon the grain side of the drive-wheel, and has its forward end slotted or bifurcated, as shown in Fig. 1, and within the slot thus formed one of the tongue or pole straps *a a* is placed, the other strap being placed at the side of the pole-plank. The two straps thus clasping one of the arms of the gear-plank snugly between them and being pivoted thereto at their rear ends by a through-bolt, lateral relative play of the main frame and tongue is effectually prevented, thus giving great steadiness to the movement of the machine without interfering with its vertical adjustment.

B is the seat-plank, supported above the inclined elevator or inner end of the platform-carrier by transverse bars arranged in front and in rear of the elevator in a well-known way, and about midway of the length of this seat-bar is secured an upright, to which the inner reel-bearer, *b*, is pivoted at or near or slightly in rear of its center. *b'* is the outer reel-bearer, pivoted in a similar manner and in the same transverse line in a frame or support, $b^2$, secured to the rear outer corner of the platform-frame, as shown in Fig. 2. The rear ends of these reel-bearers are connected by links *c* with crank-arms *c'* on a transverse rock-shaft, $c^2$, mounted in suitable bearings at the rear of the platform-frame, the arrangement being such that when any vibration is imparted to one of the reel-bearers a corresponding movement is imparted through the rock-shaft and links to the other bearer, thus simultaneously adjusting both ends of the reel-shaft supported upon the forward ends of said bearers.

Upon the forward end of the seat-plank B is mounted a bell-crank lever, *d*, connected by a link, *d'*, with the forward arm of the reel-bearer *b*, by means of which the reel-bearers can be adjusted by the driver at will, a rack at $d^{\times}$ and any usual form of thumb-latch serving to hold the lever at any desired adjustment.

The reel-shaft has its bearings in sliding boxes *e e*, placed on the forward ends of the bearers *b b*, and these boxes are connected by links *e' e'* with crank-arms on a rock-shaft, $e^2$, which, in this instance, serves as the pivotal center of the reel-bearers. The inner end of this rock-shaft is provided with a lever, $e^3$, by vibrating which the reel-shaft can be moved forward or backward at the will of the driver, as the nature of the work may require, a rack, $e^4$, serving to hold the lever at any desired adjustment.

To accommodate the adjustments of the reel, as described, the reel is connected at its inner end, by a tumbling-joint, with an extensible shaft, *f f'*, which, at its opposite end, is connected by a similar joint with a driving-shaft, $f^2$, mounted in fixed bearings *g g*, attached to the front of the elevator-frame, in such relation thereto as to be about in line with the reel-shaft in its usual or more frequent position, and around an extension of which line the reel is adjusted. By this arrangement the reel can be driven with equal facility under any adjustment, while the shaft $f^2$, being unaffected by these adjustments, may be driven by any usual or preferred arrangement of gearing or driving belts or chains connecting it with the driving-wheel.

The platform apron or carrier and the elevator-apron are made in any usual or preferred form, except that I prefer to connect the aprons and the slats thereon with an endless driving-chain placed inside of the endless apron, and about midway of its width from front to rear, and traveling upon sprocket-wheels or grooves on the apron-rollers midway of their length. By this arrangement the strain or tension and wear upon the apron is in a great measure avoided, while at the same time the tendency of the apron to sag at its center is obviated.

The inclined delivery-board E, down which the grain passes from the elevator to the binders' grain-receiver, and said receiver itself, except in particulars hereinafter recited, may be of any usual or preferred construction.

To the end boards of the elevator-frame, or to blocks F, connected therewith, are hinged by their upper ends two gaveling-boards, F′, one at the front and the other at the rear of the delivery-board E. The board E is provided at each end, near its lower edge, with a series of perforations, at $i$, arranged in the arcs of circles, of which the hinges to the boards F′ are the centers, and the lower edges of the boards F′ have each a pin, which may be placed in any one of its respective series of holes, for adjusting the angle of the boards, and thus giving direction to the movement of the descending grain for placing the gavel farther forward or farther back, as described.

The main frame, at its stubble side, has an upright frame, (indicated at $a^2$, Fig. 2,) $a^3$ representing a longitudinal bar, and the binders' stand or platform H, on its adjacent side, has a similar upright framing and longitudinal bar $a^4$, and these bars $a^3$ $a^4$, about midway of their length, are connected by a horizontal pivot, $g'$, upon which the binders'-platform frame is suspended, and upon which, also, it is adapted to be swung or vibrated for the purpose of maintaining its horizontal position under the different adjustments of the main frame.

The forward end of the binders'-platform frame is connected by a link, $h$, with the rock-shaft $h'$, through which, by means of a lever, $h^2$, the driver adjusts the height of the cutting apparatus, the arrangement being such that as the main frame is vibrated for changing the height of the cutters the binders' platform is correspondingly vibrated relative thereto for preserving its horizontality.

G is the grain-receiver, consisting of a pivoted longitudinal rod provided with a series of horizontal fingers adapted to receive and hold the grain to be bound. Just under this receiver is located the inner side of the binders'-table frame, H′, composed of a series of longitudinal bars connected by transverse bars, and forming a slotted rectangular table, open centrally at $H^2$, to accommodate the binders standing on the binders' platform H. This table is hinged at its outer edge to the upright platform-frame, and has its outer edge supported by hinged feet $h^\times$, resting in sockets on the platform H, adapting it to be folded out of the way when not in use.

The platform H has a vertical rim extending around it, giving it the form of a shallow box or receptacle for heads and loose grain that may become separated in the process of binding, &c., and the table-frame is provided at its ends which project beyond the platform with end boards, $k$, to which boards $k'$ are hinged by their upper edges, and said boards, inclining inward, as shown, have their lower ends located within this shattered-grain receptacle, for insuring the deposit of the loose or shattered grain therein.

The platform H has arms $l$ $l$ projecting from its outer side, in the outer ends of which the longitudinal pivot of the bundle carrier and dumper L has its bearings, said dumping-carrier being arranged about in the same horizontal plane with the upper edge of the rim of the platform H, as shown.

K is an inclined or concave chute, extending between the elevated binders' receptacle and the inner edge of the bundle-carrier, as shown, the arrangement being such that when the bound bundles are released at the outer edge of the receptacle G they are automatically conveyed to and deposited upon the bundle-carrier. The chute K is, by preference, made of the inclined curved bars or slats arranged between the binders; but it may be in a single wide piece, if desired.

A cord, $l'$, extends from the inner edge of the dumping-carrier L, through suitable guides, to the driver's seat, for enabling the driver to dump said carrier whenever it is desired.

Upon the slatted table H′ is placed a removable bundling attachment, constructed as follows, viz: At or near each end of said binders' table is an upright triangular frame, N, the lower or horizontal bar of which rests on the slats of the table, and has a button which, when turned longitudinally, passes between and below the slats, when, being turned transversely, it engages with the slats and fastens the end frames, N, thereto.

The outer inclined bars, N′, of the frames N extend beyond the apex of the frames, and are united at their upper ends by a horizontal bar, $N^2$, and at or near said apex said frames are further united by a horizontal shaft, O, to which motion is imparted by a cone-pulley or sprocket-wheel, P, mounted loosely on its forward end, and connected therewith as follows: The forward end of the shaft O has a cross-head, $o'$, rigidly connected with it, (see Fig. 3,) and directly in rear of said cross-head the shaft has an eccentric, $o^2$, formed upon it, which forms the journal for the cone-wheel P.

The forward face of the cone-wheel has a pin or spur, $p$, formed upon it near its periphery, and as the wheel is rotated the pin strikes one of the arms of the cross-head $o'$, and through said arm imparts a rotary movement to the shaft until, by the eccentric relation of the wheel to the cross-head, the pin $p$ moves outward sufficiently far to escape from the one arm of the cross-head, leaving the opposite arm in position to be acted upon by the pin in its turn. By this arrangement an intermitting movement is imparted to the shaft O, and it is allowed to remain stationary during just one-half the revolution of the wheel P, for a purpose which will be hereinafter explained.

The speed of the shaft O is regulated by the cone-pulleys, upon any one of the series of which the driving band or chain may operate, according to the necessities of the work, said chains being driven from one of a corresponding series of cone-pulleys, (indicated by dotted lines at P′, Fig. 1,) the shaft of the latter series of cone-pulleys being connected through bevel-wheels with a transverse shaft, $f^3$, which, in turn, is connected by a tumbling extensible shaft, $f^4$, with the shaft $f^2$, which drives the reel. By this arrangement I provide for the driving of the shaft O under all the varying relations of the swinging binders' platform and tables to the main frame.

Upon the shaft O, about midway of its length, is secured a cross arm or arms, Q, made preferably in the curved or S form shown, connected centrally to the shaft, and provided at its ends with horizontal pins or studs, on which are mounted small grooved rollers $q$, for a purpose which will be explained.

The upper bar, $N^2$, of the bundling-frame is provided with suitable bearing-brackets, in which is mounted a rock-shaft, $r$, the rear end of which is provided with a curved angular arm, $r'$, the outer swinging end of which overhangs and extends downward in close proximity with the outer edge of the binders' grain-receptacle G, as shown. A cord, $s$, is connected at one end with the swinging end of arm $r'$, and, extending up through the plane of the circle in which the grooved rollers $q$ are carried by the arm Q, and through a guiding-eye in the bar $N^2$, has its upper end connected with a spring, $t$, connected to the frame N or frame-bar $N^2$, as shown, said spring serving at all times to hold the cord $s$ taut.

The forward end of rock-shaft $r$ has an arm, $r^2$, attached, which extends down sufficiently far to engage with one of two arms or stops, $o^4$ $o^4$, on the shaft O, and which serves, when a bundle is in position and compressed, as hereinafter explained, to hold the arm $r'$ with its cord in proper position for holding the bundle.

The shaft O, in rear of the forward frame, N, is provided with a cam or ratchet disk, $u$, (see Fig. 3,) and a pawl, $u'$, pivoted to the frame N, engages with said ratchet-disk and prevents the backward rotation of the shaft O when the cross-head $o'$ is released from the pin $p$ on its driving-wheel P.

Where the bundling attachment above described is used a concave composed of two or more parallel bars, V, is arranged above and rests upon the ordinary grain-receiver, as shown, or it may be in the form of a slotted concave, in which the grain discharged by the elevator is deposited, V′ representing the slot in which the bundling-arms Q move for gathering and compressing the grain.

The operation of these devices is as follows: Supposing a sufficient quantity of grain to be in the concave V to form a bundle, a half-revolution is imparted to the shaft O by the wheel P through the connections described, imparting a continuous movement to the cross-head or bundling-arms Q. The grooved pulleys on the upper arm strike against the cord $s$, and pressing it before it carries it over and behind the grain in the concave down through the slot V′ and underneath the grain until the arm Q′ comes close to the arm $r'$, to which one end of said cord is attached, thereby forming a loop (see dotted line at $s'$) in the cord $s$, encircling or nearly encircling the bundle. When the arm Q or Q′ has reached this position the stops $o^4$ and $u$ $u'$ come into play, as described, and hold the arms Q and $r'$ while another gavel accumulates behind the arm Q′, giving the operator ample time to apply the band. During this operation, it will be seen, the bundle is tightly compressed by the cord $s$, which is held under tension by the spring $t$, the bundle being thus completed by the time the wheel P has completed its half-revolution necessary to again connect it with the shaft O, as has been explained, when, by further movement of said shaft, the arm $r'$ is released and the cord $s$ is retracted into its former right line, releasing the bundle, which is crowded outward by the following arm Q′, and descends over the chute K upon the dumping-carrier, when the operation is repeated, as before.

By the arrangement of adjustable shields in connection with the grain-receptacle, as described, the attendant is enabled to regulate with precision the delivery of the grain relative to the bundling or binding devices or to the position of the binders. Thus, where the bundling devices described in another application are employed and the machine is operating upon short grain, in order to deposit it in the receptacle with the center of its length of straw in the same transverse plane with said bundling devices, it is desirable to swing the lower end of the forward shields backward, in order to move the grain backward in its descent into the proper relation to said devices, and to prevent its being carried too far the rear shield may be swung forward and secured at the desired point. When the straw is long the shields will be correspondingly moved outward or away from each other in order to deposit the grain in the proper relation to the binders or to the bundling or binding devices.

It is well known that it is practically indispensable that the band should be placed very near the center of the gavel, and it will also be readily seen that it is very desirable that in machines of this class there should be some provision by which the butt-ends of the straw shall be evened, and shall also be delivered at such point relative to that part of the mechanism at which the band is passed around the gavel that such band shall be placed near the center of the bundle. These results are secured in my construction, and the capabilities and usefulness of the machine are greatly increased thereby.

It will also be seen that the gavel-boards are supported upon the machine independently of the chute or delivery-board or the grain-receiver—that is to say, the lower edge of the gavel-board is arranged above the upper face of the chute-board, and is not permanently atached to said chute, for which reason the chute or receiver can be moved below the gavel-board should such operation be found desirable.

I do not claim to be the first to construct a harvester with a board arranged at the end of the chute or delivery-board, as the patent to Renwick and Watson, dated December 6, 1853, shows boards at both ends of their chute; but in their construction such boards were employed as a part of the frame-work of the machine, and they certainly did not employ them to guide the grain to the desired point during its passage over the chute, because their drawing shows the grain having its butts and tips some distance removed from the boards; and, further, because they state explicitly that they propose to regulate the delivery of the grain over the chute by shifting the position of the upper end of the elevator.

I do not claim, broadly, a vertical board arranged at the end of the chute or delivery-board, irrespective of its relation to the other parts of the machine or of its function.

It is also apparent that some of the advantages growing out of the use of these shields in machines which can be tilted forward (in order to cut short or lodged grain) may be had without adjusting them or moving their lower ends inward, from the fact that, even though the lower ends remain stationary, the shields will still prevent the short grain or tangled grain from sliding off at the front end of the grain-receiver or becoming entangled with the driving-chains or other mechanism which is arranged near the end of the grain-receiver or the delivery-board.

W W′ represent band-trays for carrying either prepared bands or straw suitable for bands. These are provided with suitable lugs or ears *w*, adapting them to be readily attached to or disengaged from the table H or frames N, either or both, as preferred. Additional bands or straw therefor may be carried underneath the chute K and at the ends of the binders' platform and shattered-grain receptacle.

When the bundling attachment described is removed, the dumping-table may be raised to the plane of the tables H′—its usual position and under its usual arrangement—if preferred.

The slats of the elevator-apron, to prevent them from lagging or being deflected backward in passing over the rollers, have little angular brace-straps *x* connected to them at their ends, the feet of which rest upon the apron in rear of the slats, and so hold them up to their work. Or, instead of these, if preferred, leather or other yielding straps may be made to hold the slats by being connected therewith and with the apron in advance of the slats.

Having now described my invention, what I claim as new, and desire to secure by Letters Patent, is—

1. In a harvesting-machine, the combination, substantially as set forth, of the following elements, viz: a chute or delivery-board over which the grain passes after leaving the elevator, a grain-receiver which receives the grain from the chute or delivery-board, a platform which supports the binders, and a shield or gavel-board to determine the direction of the grain in its passage over the chute.

2. In a harvesting-machine, the combination, substantially as set forth, of the following elements, viz: a chute or delivery-board over which the grain passes after leaving the elevator, and a gavel-board suspended above the chute or delivery-board to determine the direction of the grain in its passage over the chute.

3. In a harvesting-machine, the combination, substantially as set forth, of the following elements, viz: a chute or delivery-board over which the grain passes after leaving the elevator, mechanism which grasps the grain and compresses it into bundles, and mechanism whereby the distance between the binding devices and the gavel-board above the chute or delivery-board may be increased or diminished, to insure that the grain shall be directed to the proper point for binding.

4. In a harvesting-machine, the combination, substantially as set forth, of the following elements, viz: a main frame supported upon two wheels and carrying a cutting apparatus, a hinged tongue, and device adapted to be operated by the driver for tilting the machine upon its carrying-wheels, a carrier which receives the cut grain and delivers it to the elevator, an elevator which elevates the grain over the main driving or supporting wheel, a chute or delivery-board which receives the grain from the elevator, and a gavel-board to determine the direction of the grain in its passage over the chute.

5. In a harvesting-machine, the combination, substantially as set forth, of the following elements, viz: a main frame supported upon two wheels and carrying a cutting apparatus, a hinged tongue, a device adapted to be operated by the driver for tilting the machine upon its carrying-wheels, a carrier which receives the grain and delivers it to the elevator, an elevator which elevates the grain over the main driving and supporting wheel, a chute or delivery-board which receives the grain from the elevator, a grain-receiver which receives the grain from the chute or delivery-board, and a gavel-board to determine the direction of the grain in its passage over the chute.

6. In a harvesting-machine, the combination, substantially as set forth, of the following elements, viz: a main frame supported upon two wheels and carrying a cutting apparatus, a hinged tongue, mechanism for adjusting the height of the machine upon the main carrying and driving wheel, mechanism adapted to be operated by the driver for tilting the machine upon the carrying-wheels, a carrier which receives the cut grain and delivers it to the elevator, an elevator which elevates the grain over the main driving and supporting wheel, a chute or delivery-board which receives the grain from the elevator, and a gavel-board to determine the direction of the grain in its passage over the chute.

7. The reel mounted in sliding boxes on the pivoted reel-bearers $b$ $b'$, in combination with the rock-shaft $e^2$, connecting-links $e'$, and adjusting-levers $d$ $e^3$, all arranged and operated as described.

8. The gear-plank, slotted or forked at its forward end, in combination with the tongue-traps, arranged to stride one of the arms of said gear-plank, as described.

9. The dumping bundle-carrier L, in combination with the inclined delivery-chute K, extending between the binders' grain-receiver and said carrier, and arranged in the described relation thereto, substantially as and for the purposes set forth.

10. The binders'-carriage frame, suspended from the main frame on a transverse pivot arranged at or near its upper edge, and adapted to be vibrated thereon by means of the rock-shaft and connecting-link $h$, arranged and operated substantially as described.

11. The rotating bundling-arm Q, in combination with the compressing-cord $s$, arranged and operated substantially as described.

12. The shaft of the bundling-arm Q, having the eccentric arrangement to its driving-wheel P, in combination with the arms or cross-head $o'$ and actuating pin or tooth $h$, arranged and operated as described.

13. The bundling-arms Q and the vibrating arm $r'$, to which the compressing cord or strap is connected, in combination with the stops $o^4$ and $u'$, for locking said arms in position while the gavel is being bound, substantially as described.

14. The combination of the shaft O, the devices which impart an intermittent rotation to said shaft, the gaveling-arms Q, mounted upon said shaft, and the cone-pulleys P, substantially as and for the purposes described.

15. The bundling attachment consisting of the frame N N′, with its bundling-shaft O, arm Q, and compressing devices, made removable as a whole when desired, substantially as and for the purposes set forth.

In testimony that I claim the foregoing I have hereunto set my hand this 22d day of May, 1879.

J. H. ELWARD.

Witnesses:
G. ROOSEN,
H. J. CHAMBERS.